Jan. 13, 1925.  1,522,705
J. R. WAGNER ET AL
HEADLIGHT FOR MOTOR VEHICLES
Filed Nov. 25, 1922  2 Sheets-Sheet 1

Jerome R. Wagner
and Harry Kelly
INVENTORS

BY Victor J. Evans
ATTORNEY

Jan. 13, 1925.  1,522,705
J. R. WAGNER ET AL
HEADLIGHT FOR MOTOR VEHICLES
Filed Nov. 25, 1922   2 Sheets-Sheet 2
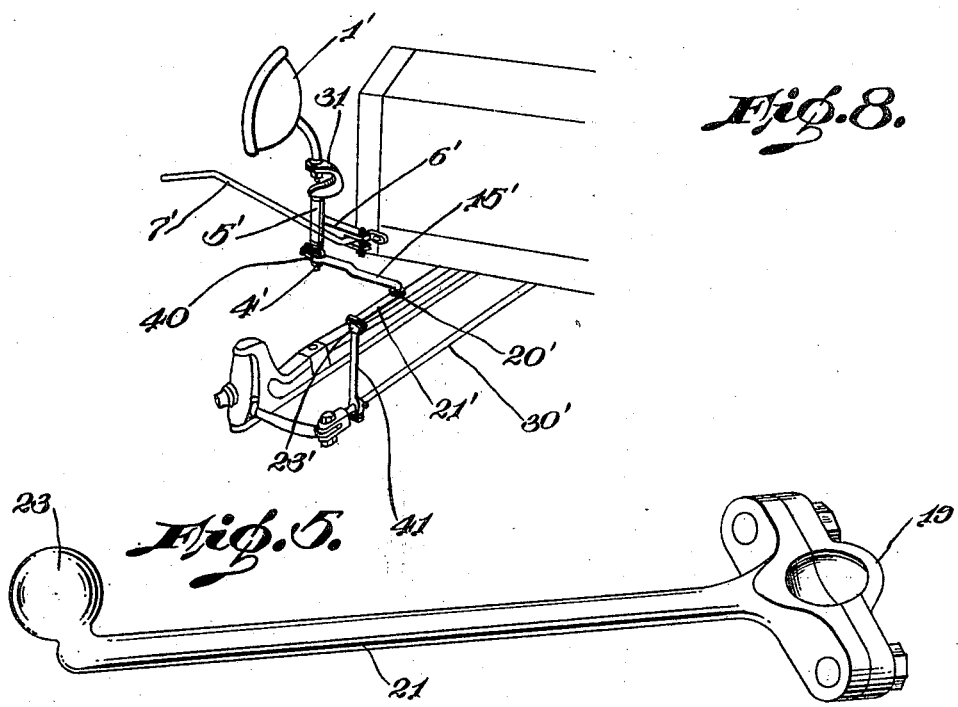
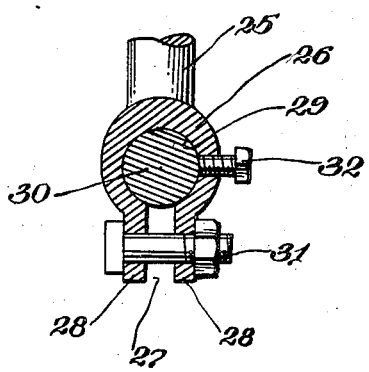
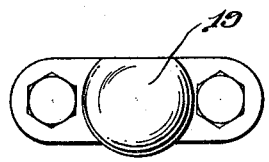
Jerome R. Wagner
and Harry Kelly
INVENTORS
BY Victor J. Evans
ATTORNEY Patented Jan. 13, 1925.

1,522,705

UNITED STATES PATENT OFFICE.

JEROME R. WAGNER AND HARRY KELLY, OF BIJOU HILLS, SOUTH DAKOTA.

HEADLIGHT FOR MOTOR VEHICLES.

Application filed November 25, 1922. Serial No, 603,360.

*To all whom it may concern:*

Be it known that we, JEROME R. WAGNER and HARRY KELLY, citizens of the United States, residing at Bijou Hills, in the county of Brule and State of South Dakota, have invented new and useful Improvements in Headlights for Motor Vehicles, of which the following is a specification.

This invention relates to a head light operating attachment for motor vehicles, and an object of the invention is to provide an attachment for connecting the head lights to the cross rods of the steering mechanism of the vehicle, whereby the head lights will be turned in unison with the steering movement of the front wheels of the vehicle for directing the light rays from the head lights in the path to be followed by the vehicle.

Another object of this invention is to provide an attachment as specified which is constructed so as to provide a relatively great amount of sweep to compensate for the up and down motions and irregular lateral motions caused by the travel of the vehicle over rough surfaces, and also to provide an attachment which may be applied to the existing type of motor vehicles without requiring extensive alterations thereto and without requiring the substitution of any parts for the standard parts of the vehicle.

Other objects of the invention will appear in the following detailed description taken in connection with the accompanying drawings wherein:—

Fig. 5 is a perspective view of a second arm used in the head light construction.

Fig. 6 is a detail view of a ball and socket joint used in the head light construction.

Fig. 7 is a detail vertical section on the line 7—7 of Fig. 1.

Fig. 8 is a perspective view of a modified form of the invention.

Figure 1:
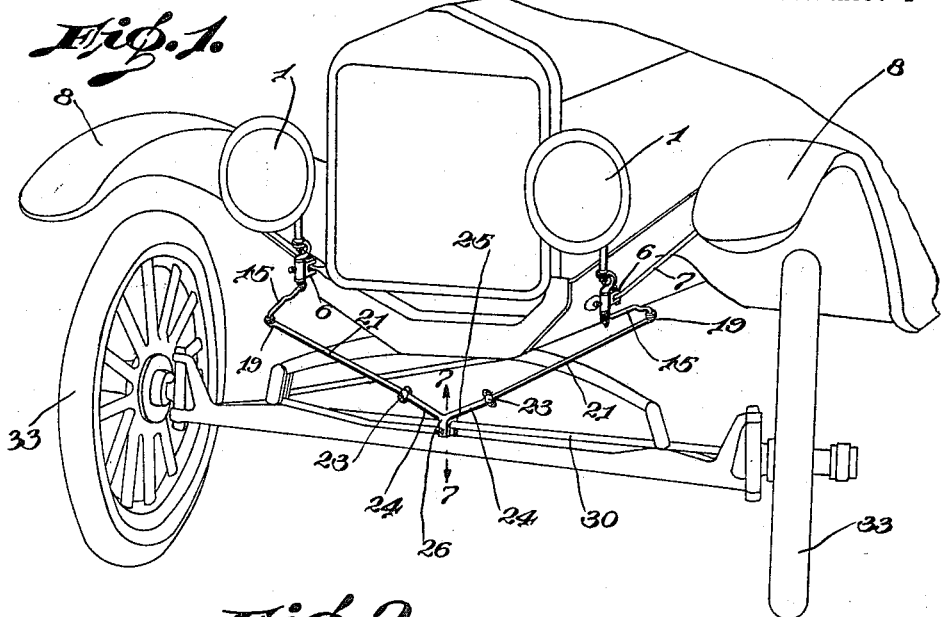
Fig. 1 is a perspective view of the improved attachment showing it applied.
Figures 2, 3, 4:
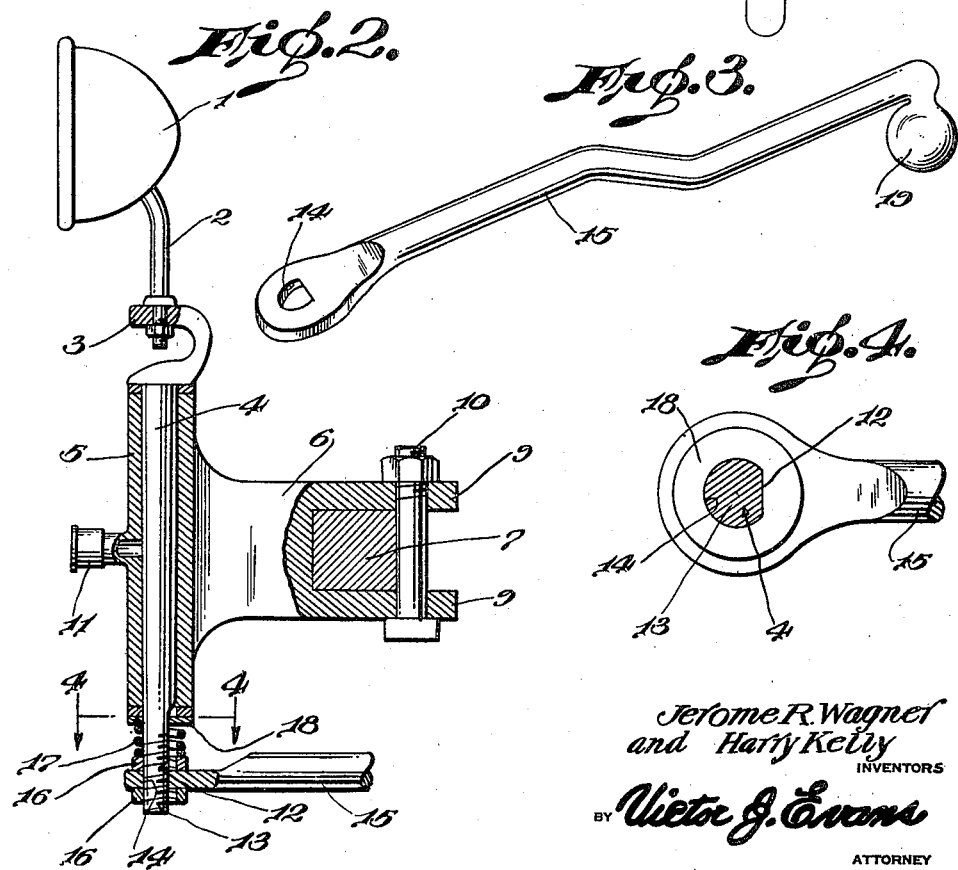
Fig. 2 is a fragmentary vertical section through the improved head light turning attachment.
Fig. 3 is a perspective view of an arm used in the head light construction.
Fig. 4 is a detail horizontal section taken on the line 4—4 of Fig. 2.

Referring more particularly to the drawings, the head lights 1 which may be of any approved construction, are carried by standards 2 the lower ends of which extend through the arms 3 formed upon the vertical shafts 4. The vertical shafts 4 are rotatably carried by bearing sleeves 5 which are in turn supported by means of attaching supporting arms 6 from the brace rods or bars 7 of the vehicle structure, which are provided for bracing the front ends of the fenders 8 of the vehicle. The supporting attaching brackets 6 each comprises a pair of arms 9 which are clamped by means of a bolt 10 against the bracing bars 7. Lubricating cups 11 are provided to permit lubrication of the bearing surface of the bearing sleeves 5 and shafts 4.

The lower ends of the shafts 4 are screw threaded and have flattened sides 12 thereon. The flattened threaded lower ends 13 of the shafts 4 extend through openings 14 formed in the operating rods 15, and the operating rods 15 are connected to the shafts 4 by means of suitable nuts 16 threaded upon the ends 13. Springs 17 are provided for maintaining the proper yieldable relation between the bearing sleeves 5 and arms or rods 15, and these springs bear against suitable bearing washers 18 and against the upper lock nuts 16. The upper lock nuts 16 are connected to the springs 17 to put the proper tension on the springs for exerting a downward pressure on the shafts 4. The nuts 16 one above and one below each of the arms 15 will provide a rigid connection between the arms 15 and shafts 4. The washers 18 have openings 20 which fit the flattened portions of the shafts 4 so that the washers and shafts will move in unison.

The arms 15 which are similar in construction are connected by ball and socket joints 19 of conventional form to rods 21.

The rods 21 extend downwardly from the rods 15 and are connected by means of ball and socket joints 23 to the upper ends of the arms 24 of the substantially Y shaped attaching member 25. The stem 26 of the substantially Y shaped member 25 is split as shown at 27 providing arms 28 and it is also shaped to provide a rounded portion 29 which engages over the cross rod 30 of the front wheel steering structure of the motor vehicle. A clamping bolt 31 is provided for clamping the Y shaped member 25 upon the cross rod and a set screw 32 is also provided for facilitating the preventing of accidental movement of the Y shaped member relative to the cross rod.

As clearly shown in Fig. 1 of the drawings the Y shaped member 25 is clamped to the cross rod intermediate its ends and the shafts 4 to which the lamps 1 are directly connected, are in turn connected to the arms 24 of the Y shaped member 25 by articulated connections provided by the arms 15 and 21, thereby permitting turning of the head lights 1 in unison with the turning of the front wheels 33 of the vehicle so as to always direct the paths of light from the head lights in the direction to be taken by the vehicle. The provision of the rods 15 and 21 and their universal connections through the medium of the ball and socket joints will permit the vibratory movement of the running gears of the vehicle relative to the chassis without in any way interfering with the light structures.

In Fig. 8 of the drawings, a modified form of the invention is shown in which the head light 1' is connected to the upper substantially horizontal arm 3' formed upon the upper end of the shaft 4'. The shaft 4' is rotatably carried by a bearing sleeve 5' which is in turn connected by means of a bracket 6' to the brace bar 7'. In this manner the construction of the modified form is similar to the construction of the preferred form. The rod 15' which replaces the rods 15 of the approved structure has one end forked as shown at 40 and this forked end is clamped about the lower end of the shaft 4' in any suitable manner so as to rotate the shaft 4' by movement of the rod 15'. The rod 15' is connected by means of a ball and socket joint 20' to a rod 21', and the rod 21' is in turn connected by means of a ball and socket joint 23' to a vertical rod 41. The vertical rod 41 is connected to the cross rod 30' of the vehicle, adjacent one end thereof, in the same manner in which the substantially Y shaped member 25 is connected to the cross rod.

The modified form of the invention provides separate connection between each lamp carrying shaft 4' and the cross rod 30' at the ends of the cross rod, however, this operation is similar to the operation of the preferred form.

It is, of course, to be understood that the invention may be constructed in other manners and the parts associated in different relations and, therefore, we do not desire to be limited in any manner except as set forth in the claims hereunto appended.

Having thus described our invention what we claim is:—

1. In a device as set forth, the combination with a steering cross rod and head lights of a motor vehicle, of shafts mounted for movement about vertical axes, said shafts have transverse supporting ends, said head lights connected to said transverse supporting ends, a substantially Y shaped member clamped upon said cross rod, and articulated connections between said shafts and Y shaped member for rotating said shafts upon steering movement of the cross rod.

2. In a device as set forth, the combination with a steering cross rod and head lights of a motor vehicle, of shafts mounted for movement about vertical axes, said shafts have transverse supporting ends, said head lights connected to said transverse supporting ends, a substantially Y shaped member clamped upon said cross rod, and articulated connections between said shafts and Y shaped member for rotating said shafts upon steering movement of the cross rod, and yieldable connections between said articulated connections and said shafts.

3. In a device as set forth, the combination with a steering cross rod and head lights of a motor vehicle, of shafts mounted for movement about vertical axes, said shafts have transverse supporting ends, said head lights connected to said transverse supporting ends, a substantially Y shaped member clamped upon said cross rod, rods yieldably connected to said shafts, rods connected by means of ball and socket joints to said Y shaped member, and ball and socket joints connecting said first and second named rods.

In testimony whereof we affix our signatures.

JEROME R. WAGNER.
HARRY KELLY.